(12) United States Patent
Zydek et al.

(10) Patent No.: US 10,685,561 B2
(45) Date of Patent: Jun. 16, 2020

(54) METHOD FOR OPERATING A CENTRAL SERVER AND A METHOD FOR HANDLING A CONTROL CARD

(71) Applicant: Continental Teves AG & Co. oHG, Frankfurt (DE)

(72) Inventors: Bastian Zydek, Bad Soden (DE); Thomas Grotendorst, Eschborn (DE); Enno Kelling, Eschborn (DE); Stefan Lüke, Rosbach vor der Höhe (DE); Marc Menzel, Weimar (DE)

(73) Assignee: Continental Teves AG & Co. oHG (DE)

( * ) Notice: Subject to any disclaimer, the term of this patent is extended or adjusted under 35 U.S.C. 154(b) by 324 days.

(21) Appl. No.: 15/514,290

(22) PCT Filed: Oct. 8, 2015

(86) PCT No.: PCT/EP2015/073240
§ 371 (c)(1),
(2) Date: Mar. 24, 2017

(87) PCT Pub. No.: WO2016/055560
PCT Pub. Date: Apr. 14, 2016

(65) Prior Publication Data
US 2017/0278390 A1 Sep. 28, 2017

(30) Foreign Application Priority Data

Oct. 10, 2014 (DE) ................. 10 2014 220 625

(51) Int. Cl.
*G08G 1/0962* (2006.01)
*G08G 1/0967* (2006.01)
(Continued)

(52) U.S. Cl.
CPC ......... *G08G 1/09623* (2013.01); *B60W 30/00* (2013.01); *G08G 1/09626* (2013.01);
(Continued)

(58) Field of Classification Search
None
See application file for complete search history.

(56) References Cited

U.S. PATENT DOCUMENTS 9,442,489 B2  9/2016 Reichel et al.
2011/0087433 A1* 4/2011 Yester .................... G08G 1/163
                                                    701/301

(Continued)

FOREIGN PATENT DOCUMENTS

DE    102010030867 A1    1/2012
DE    102011083777 A1    4/2013
(Continued)

OTHER PUBLICATIONS

International Preliminary Report on Patentability and Written Opinion for International Application No. PCT/EP2015/073240, dated Apr. 11, 2017, 8 pages.

(Continued)

*Primary Examiner* — Navid Ziaeianmehdizadeh
(74) *Attorney, Agent, or Firm* — RatnerPrestia (57) ABSTRACT

A method for operating a central server, which enables a central management of control cards containing traffic rules. The invention further includes methods for handling control cards in vehicles, in particular in cooperation with such a central server.

24 Claims, 4 Drawing Sheets (51) Int. Cl.
  *B60W 30/00* (2006.01)
  *G08G 1/16* (2006.01)

(52) U.S. Cl.
  CPC ... *G08G 1/09675* (2013.01); *G08G 1/096716* (2013.01); *G08G 1/096725* (2013.01); *G08G 1/096741* (2013.01); *G08G 1/096775* (2013.01); *G08G 1/096791* (2013.01); *G08G 1/164* (2013.01)

(56) References Cited

U.S. PATENT DOCUMENTS

| | | |
|---|---|---|
| 2014/0278029 A1 | 9/2014 | Tonguz et al. |
| 2017/0025005 A1 | 1/2017 | Barth et al. |

FOREIGN PATENT DOCUMENTS

| | | | |
|---|---|---|---|
| DE | 102012021282 A1 | 4/2014 | |
| DE | 102014003550 A1 | 9/2014 | |
| EP | 1569183 A2 | 8/2005 | |
| EP | 2205945 B1 | 5/2013 | |

OTHER PUBLICATIONS

Campbell, M., et al., "Autonomous driving in urban environments: approaches, lessons and challenges," Oct. 13, 2010, pp. 4649-4672, vol. 5469, No. 1928, Philosophical Transactions of the Royal Society A: Mathematical, Physical and Engineering Sciences.

International Search Report and Written Opinion for International Application No. PCT/EP2015/073240, dated Dec. 22, 2015, 10 pages.

German Search Report for German Application No. 10 2014 220 625.1, dated Aug. 4, 2015, including partial English translation, 11 pages.

\* cited by examiner

CONTROL CARD

Traffic Rule 1: Give Way
Traffic Rule 2: Right-of-Way
Traffic Rule 3: No Overtaking
Traffic Rule 4: Speed Limit

Fig. 3

Compare a first control card to a second control card. The first control card indicating first traffic rules followed by a first vehicle, and the second control card indicating second traffic rules followed by a second vehicle.
31

In response to the comparison indicating that the first traffic rules of the first control card match the second traffic rules of the second control card, send a confirmation to the first vehicle and to the second vehicle.
32

In response to the comparison indicating that the first traffic rules of the first control card do not match the second traffic rules of the second control card:
    evaluating information related to the generation of the first control card and the second control card,
    Creating, based on the evaluation, a common control card including common traffic rules for both the first vehicle and the second vehicle to follow, and
    sending the common control card to the first vehicle and the second vehicle.
33

Fig. 4

METHOD FOR OPERATING A CENTRAL SERVER AND A METHOD FOR HANDLING A CONTROL CARD

CROSS REFERENCE TO RELATED APPLICATIONS

This application is the U.S. National Phase Application of PCT International Application No. PCT/EP2015/073240, filed Oct. 8, 2015, which claims priority to German Patent Application No. 10 2014 220 625.1, filed Oct. 10, 2014, the contents of such applications being incorporated by reference herein.

FIELD OF THE INVENTION

The invention relates to a method for operating a central server and a method for handling a control card that contains traffic rules in a vehicle.

BACKGROUND OF THE INVENTION

Traffic regulations are currently usually defined by generally applied rules such as give way to the right, traffic signs, light signals or by traffic police. Individually steered vehicles, such as motor vehicles or bicycles, rail vehicles such as trams and also pedestrians, are able to avoid potential collisions and accidents by following these rules. This applies to right-of-way rules for example, but also to other traffic regulations such as no overtaking, for example.

For modern vehicles and other road users, traffic regulations are usually read by the driver, or pedestrian from road signs, light signals or traffic police or are determined from the specific traffic conditions. Thus for example, a driver can tell in the absence of road signs at an intersection that the basic rule of giving way to the right applies. He can deduce from other vehicles at the intersection whether he has right-of-way or not, i.e. has to give way if necessary. If the driver sees a member of the traffic police, he can also tell whether he is allowed to drive on or not. When a vehicle is approaching a junction, for example an access road to a motorway or other highway, the driver can determine from the laws of the country whether a merging vehicle should in principle wait for a gap in the flowing traffic, or whether the merging vehicle is given priority.

The manual interpretation of traffic regulations is always associated with the risk of human error. The result of incorrectly interpreting the traffic regulations or deliberately disregarding traffic regulations means that there is a very high risk of an accident. Therefore, systems have already been developed that interpret traffic regulations, for example by means of a camera, and help the driver to observe the traffic regulations. Of course, said systems cannot prevent an accident, particularly if at least one vehicle involved in a situation to be controlled interprets at least one traffic rule incorrectly. This may be a result of technical faults for example or also recognition problems, such as having a road sign covered in snow.

SUMMARY OF THE INVENTION

Therefore, an aspect of the invention aims to provide an alternative, for example improved, method for handling traffic regulations.

An aspect of the invention relates to a method for operating a central server for managing control cards, wherein the method comprises the following step:

Sending a control card to a vehicle.

By means of the method according to an aspect of the invention, traffic rules can be centrally managed. This permits the direct supply of vehicles with control cards and the traffic rules contained in them, so that they are no longer dependent on the interpretation of traffic rules using local sensors. Additionally, a synchronization of the traffic rules in a plurality of vehicles is possible. For example, in this way it is possible to prevent two vehicles crossing an intersection having to signal to the other driver respectively, that one of them has the right-of-way, as the vehicles are reliably supplied centrally with control cards according to the invention. However, this is only one possible area of application of the method according to the invention. Numerous other applications are possible, for example such as those described further below.

The use of a control card is particularly advantageous because such a card is not restricted to including the traffic regulations for one's own vehicle, but can also contain traffic regulations applicable to other road users, in particular vehicles. On a technical level, by means of such a card, the conditions are set for taking into account not only the traffic regulations applicable to oneself but also those that apply to other road users.

The central server can also be described as a back end or global back end

Traffic regulations can be defined in particular as a right-of-way or give way and no overtaking. Other traffic regulations can also be processed by means of the method according to the invention, for example speed limits or stopping restrictions.

A control card is defined in particular as a set of traffic regulations, which are assigned for example to a situation to be regulated and/or to a road section or area to be regulated. In particular, a control card can contain traffic regulations that correspond with one another, for example right-of-way rules for each road and each driving direction of several roads which cross at an intersection, or right-of-way rules for a motorway and an access lane onto the motorway. Ideally the traffic regulations should correspond with one another so that by observing the traffic regulations a collision between the vehicles involved is avoided. For example, this can mean at an intersection that both directions of a continuous road have right-of-way, whilst both directions of a crossing road have to give way. At a junction this can mean that priority is given to the continuous traffic or the merging traffic. On a road where overtaking is possible this can mean that with two-way traffic a temporary no overtaking rule is established, for example no overtaking a slow-moving vehicle such as a lorry or an agricultural vehicle.

A control card can be used for example to display to the driver the traffic regulations contained therein on the instrument panel or in a head-up display. It can however also be used for example for an autonomous driving system or for an assistance system, for example.

According to one embodiment, it is provided that
the method is performed by a vehicle in response to a reception of a command to send a control card,
wherein the command preferably contains information on the control card to be sent.

In this manner, for example, a vehicle that determines an approach to a certain crossroads can request a control card in a systematic way by means of a command. The command here preferably contains information on the crossroads or another position in question. The command can also contain additional information, such as self-detected traffic rules or about other detected vehicles.

According to one embodiment, it is provided that the method is performed in response to a receipt of a control card from a vehicle.

In this manner, a vehicle can send a self-produced control card with self-detected traffic rules or also a control card obtained from another vehicle to the server, wherein the server can for example confirm, verify or correct the control card, or replace it with another control, card. It can also use the control card obtained from the vehicle to update a database with control cards.

This also allows a following vehicle, before making an intended overtaking maneuver, asks the central server whether an overtaking maneuver is possible. The central server can in this case in particular draw on a control card that has been transmitted to the server by a vehicle driving in front, which typically is moving slowly. If the slow-moving vehicle does not detect any oncoming traffic a control card can be generated which does not include a no overtaking instruction. If oncoming traffic has been identified a control card can be produced which includes a temporary no overtaking rule. This control card is then transmitted via the central server to the following vehicle and indicates to the latter whether an overtaking procedure is possible or should not be attempted.

The following vehicle can send the request for transmitting a control card, in particular relating to the proposal of collaborating in an overtaking procedure, whereby in said proposal the slow-moving vehicle can communicate to following vehicles that it is able to collaborate with the planning of an overtaking procedure. This proposal can for example be sent directly for also via the central server.

Control cards can also be issued continuously by the server. In this way, for example, the vehicles, in particular those involved in a situation which requires regulation can continually exchange their control cards or receive control cards, in particular in order to identify any problems, for example control cards that do not correspond or match, as early as possible and prevent accidents. The method can also be performed such that the server continually sends one or more control cards, regardless of whether they are received by another vehicle or another unit.

According to one embodiment, it is provided that the control card to be sent is read from a database.

In such a database, control cards are preferably stored for a number or plurality of intersections. This permits efficient management of the control cards. For example, the database can be an SQL database.

According to one embodiment, it is provided that control card to be sent is produced in a matching step.

This enables the production of a control card, in particular with the central server, in a matching process or matching step, in which the vehicles or information provided by the vehicles can be incorporated. The control card then typically applies to a number of vehicles involved. In particular, a reaction is possible to at least initially unclear situations.

According to one embodiment, it is provided that the matching step is designed in response to the fact that it has been determined during the course of a comparison that at least one first control card and one second control card do not match.

In this way, if the control cards do not match, a matching procedure or matching step can be triggered that can lead, for example, to matching control cards which reduce the risk of accident further. Control cards that do not match are defined in particular as control cards, which display for at least one actually present or only for a possibly present vehicle at least two different traffic regulations. For example, two non-matching control cards can be designed such that one control card indicates right-of-way for a specific road at an intersection in a specific direction, whereas the other control card indicates to give way. Matching control cards typically indicate for all possible vehicle locations the same traffic regulations respectively.

When the control cards match, typically no matching step is triggered. In this case for example a communication can be sent directly between the vehicles involved or via the central server, wherein the communication shows that that the control cards match. This indicates that the intersection can be passed on the basis of the matching control cards without risk by all of the vehicles involved.

According to one embodiment, it is provided that
   the first control card has been received by a vehicle, and
   the second rule map has been received by another vehicle or has been read from a database.

This allows, particularly, a comparison between control cards, which have, for example, been produced by different vehicles using the respective environmental sensors. However, a control card read from a database and a control card received by a vehicle can also be compared with each other.

According to one embodiment, it is provided that the first control card, the second control card and the control card to be sent are assigned to an intersection, a junction or a road.

This corresponds to typical situations which require regulation.

According to one embodiment, it is provided that
   the matching step is implemented for coordination between a number of vehicles involved
     wherein the control card to be sent is preferably sent to all vehicles involved.

Here, in particular, control cards that have been received from the vehicles can be used as a basis, wherein these have for example been captured by the respective vehicles using environmental sensors such as cameras.

According to one embodiment, the vehicle and other vehicles are involved in the matching step that are approaching an intersection or junction or that are driving on the same road. According to a further embodiment, which can also be combined with the latter, only those vehicles are involved in the matching step from which an intersection of respective trajectories has been calculated.

This corresponds to typical groups of vehicles, between which it is advantageous to compare traffic regulations or control cards containing said traffic regulations.

According to one embodiment, it is provided that the matching step is conducted by matching control cards and/or plausibility information of vehicles involved.

In this way, control cards from the server can be improved, for example iteratively improved, so that a common control card is produced for all vehicles. Plausibility information can include for example accompanying information, for example about reliabilities. For example, this information can be the information or data described elsewhere, which can be sent together with a control card. Information about reliabilities, for example from environmental sensors, can be used, for example, to give priority to specific control cards or to attribute greater importance to them, if they have been generated using particularly reliable sensors.

According to one embodiment it is provided that a comparison of control cards and/or plausibility information includes a respective plausibility check, wherein a plausibility check preferably comprises one or more of the following steps:

evaluating and/or weighting available information, in particular with reference to information from vehicles involved, determining the significance and/or reliability of information, checking which other vehicles have identical information or have sent identical information, adding information, if this is complementary.

As part of a respective plausibility check, respective control cards can be evaluated and/or modified, so that a control card is formed that can use all of the vehicles involved or that applies to all vehicles. If identical information is available from a plurality of vehicles, this information typically has a greater degree of reliability, so that it can be taken into particular consideration, when creating a common control card. The same can apply to more significant and/or more reliable information.

Complementary information is defined in particular as information which can be taken over without any changes into a single control card, without thereby increasing the risk of collision of vehicles complying with said control card. For example, this can consist of complementary information in the case of a right-of-way for a road and give way for a crossing road and complementary traffic regulations.

According to one embodiment, it is provided that when performing the matching step, one or more of the following steps are performed, e.g. they are performed iteratively:

evaluating the significance and/or confidence level of information with thresholds or probabilities, for example dangerous situations or driving mode such as self-driving or automatic driving of a respective vehicle, plausibility checking, for example technically or statistically, bringing together information, in particular all available information, merging, in particular creating a new, for example extended, in particular spatially extended and/or refined image, which in particular has a consistent content.

An image can be defined for example as a control card. This can also include a differently represented assessment of a traffic situation or a road topology. An image has consistent content in particular when the respective traffic regulations correspond with one another, so that the probability of collision when observing the traffic regulations or a control card created from the latter cannot be increased and/or is minimal.

It should be understood that the matching step can be performed both solely by the central server and in cooperation between the server and a number of vehicles. The method is thus, particularly in this case, not restricted to being performed in a server. It can for example also be a method which is performed distributed over several vehicles.

According to one embodiment, it is provided that the method also comprises the following step:

Storing of the control card produced in the matching step in a database

In this way, a control card produced can be stored for later use. For example, this control card can take newly-erected traffic signs or a modified intersection topology into account, which have not to date been taken into account in the control card stored in the database. It should be understood that it is also possible to receive a control card from a vehicle and store it unmodified in the database, preferably following suitable checks.

According to one embodiment, the method for performing the matching step also comprises a step of identifying a blockage.

A blockage is defined in particular as a situation in which a plurality of vehicles are moving towards one another or are arranged such that it is not possible to define a clear right-of-way rule. This may be the case for example when four vehicles from different directions are approaching an intersection where the right-before-left rule applies and reach the intersection at the same time.

According to one embodiment, it is provided that in the case of a blockage a control card is created, which enables the best possible flow of traffic, in which vehicles which cannot participate in the process, in particular vehicles without car-to-X-communication technology, are let through with priority, and/or in which, particularly in the case of an impasse, priorities are allocated to vehicles on the basis of one or more of the following parameters:

driving speed, fixed set of rules, driving direction, for example compass direction, counter status of respective priority counter, navigation information, information about activated components such as a navigation system, information about indicators, information about automatic steering, information about giving way, destination, planned trajectory, special action rights or provision of special right-of-way features;

or wherein in the case of a blockage the matching procedure is interrupted.

An impasse is defined in particular as a situation in which none of the vehicles has right-of-way a priori. The term giving way is defined in particular to mean that a vehicle forgoes its possible right-of-way on its own accord, the giving way being preferably communicated to the other vehicles involved and/or the central server.

By a yielding of a vehicle, the complexity of the rules can be reduced considerably, as a vehicle which gives way leads to giving priority at least at a clear and directly registerable traffic regulation. It is in particular possible that a vehicle involved in the coordination step checks whether a yielding is appropriate, and communicates the yielding to the central server.

Special action rights can in fact include particular rights that are taken advantage of, for example exceeding the speed limit when an ambulance or fire engine is responding to an emergency. Right-of-way features can be provided independently of their actual utilization, for example when an ambulance is not responding to an emergency and is adhering to the traffic regulations.

According to one embodiment, it is provided that when performing the matching step there is a random allocation of priorities to the vehicles involved, wherein a vehicle with a higher priority has right-of-way over vehicles with a lower priority.

In the absence of other indicators for priorities, this allows a pragmatic, simple and fair allocation of priorities to the individual vehicles. Rights-of-way or priorities should preferably correspond with one another, which can mean in particular, that the respective rights-of-way or priorities or traffic regulations derived from the latter result in the lowest possible risk of accident.

It is also possible to grant privileges respectively to vehicles which are not equipped with technology for communicating with the central server and/or which are otherwise not capable of participating in the method. Additionally, vehicles with special action rights or other privilege features can be granted privileges, for example ambulances or fire brigade vehicles.

According to one embodiment, it is provided that if a termination criterion is met during the matching step, the method comprises a step of terminating the matching step.

This makes it possible to react to a particularly difficult situation, where for example it is possible to avoid a matching step that is too long and possibly inconclusive. In particular, for example it is possible to avoid the matching step taking up too much time, in order to ensure the safe control of the traffic situation before the arrival of the vehicles at the critical location. When terminating the matching step for example driving maneuvers can be stopped; and this can be transmitted to the respective driver, or other suitable measures can be taken for avoiding a collision in particular. The termination can in particular be communicated by the central server to the vehicles involved.

According to one embodiment, it is provided that control cards are sent by vehicles or received by vehicles via a radio connection, in particular in a car-to-X-message.

This enables in particular the direct exchange of control cards or confirmations between the vehicles involved and the server, according to one embodiment without the interconnection of a mobile network.

According to one embodiment, it is provided that the method also comprises the following step:
Storing of a control card produced in a matching step, received by a vehicle or entered by a user in a database.

This makes it possible to use a control card that has been produced, received, or also entered by a user for updating the database. In particular, in this way, a user who for example learns of a change to the traffic rules can manually update the corresponding control cards, so that the new traffic rules are immediately available to be sent to vehicles, and not only first established in a matching process.

According to one embodiment, it is provided that
the control card is evaluated in the database before it is stored, in particular, it is checked for plausibility on the basis of reliability information,
and the control card is only stored in the database when the evaluation shows that the control card should be stored.

This prevents the storage of an erroneous control card. For example, reference can be made here to the criteria mentioned elsewhere.

An aspect of the invention further relates to a method for handling a control card containing traffic regulations in a motor vehicle, which comprises the following step:
receiving a control card directly from a central server.

In this way, a vehicle can receive a control card from a central server and in particular use it directly, for example for a display to the driver, for use in a system for autonomous driving or in an assistance system. According to one embodiment, an independent interpretation of traffic rules by the vehicle can be omitted, so that it relies solely on the received control card. The received control card can however also be synchronized with self-interpreted traffic rules, wherein any irregularities can for example be reported to the central server.

According to one embodiment, it is provided that the method further features, prior to the step of receiving, a step of sending a command to send a control card to the central server.

In this way, the vehicle can for example request a control card when it detects that it is approaching an intersection or another point which requires regulation. It can also request a control card when, for example, it is driving behind a slowly-moving vehicle and wishes to know whether a temporary restriction on overtaking is in place, which would not permit an overtaking maneuver. Other traffic rules can also be queried in this manner.

An aspect of the invention relates to a method for handling a control card containing traffic regulations in a motor vehicle, which comprises the following steps:
identifying the environmental surroundings by means of a number of environmental sensors,
deriving a number of traffic regulations based on the environmental surroundings, and
producing the control card on the basis at least of the traffic regulations.
sending the control card to a central server.

By means of this method, a traffic rule can be interpreted in a vehicle and in response to this a control card can be produced and transmitted to the central server. In this way, for example, the functions named above for implementing a synchronization step or for updating a database can be implemented. For example, as a traffic rule, a temporary restriction on overtaking can also be derived when a vehicle detects that oncoming traffic prevents an overtaking maneuver by following vehicles.

Environmental surroundings can include for example an intersection, a number of road signs, a number of light signals, a number of further vehicles or other road users, a junction and/or a road. They can also include a specific situation that requires regulation, for example when a slow-moving vehicle identifies oncoming traffic that prevents overtaking by following vehicles.

The environmental sensors can comprise a number of cameras, for example. However, they can also consist of other environmental sensors, for example ultrasound sensors, radar devices, car-to-X-communication means or mobile network communication means. By means of a camera, intersection topologies, road signs, junctions or oncoming vehicles, for example, can be identified.

For example, traffic regulations can be identified from road signs or intersection topologies. From an identified road sign, for example right-of-way, give way or STOP, the corresponding traffic rule can typically be directly derived. From an identified intersection topology without road signs the basic rule can be defined as right-before-left, wherein with reference to other identified vehicles, a traffic rule can be derived for one's own vehicle. A right-of-way rule can be determined from an identified junction or access road, taking into consideration the local laws and regulations. From the identified oncoming vehicles it is possible to derive a no overtaking rule for following vehicles.

The control card is typically produced in that firstly the directly derived rules, for example from an identified right-of-way sign, are written onto the control card and then corresponding, compulsory traffic regulations are written onto the control card. For example, a right-of-way of one's own vehicle can correspond with a give way rule for crossing traffic, as otherwise there would be a risk of an accident. The right-of-way of a vehicle driving on the motorway can correspond with a give-way rule for a merging vehicle.

By sending control cards to the external unit it is possible in particular to check whether the control card corresponds with other control cards or produces a consistent image together with other control cards. This means in particular that the control cards contain traffic regulations which result in the least possible risk of accident.

According to one embodiment, it is provided that the method further features; after the step of sending, a step of receiving a control card from the central server.

In this way, the vehicle can in particular obtain a control card when the control card sent by it itself to the central server, for example in a matching step, has in particular as explained elsewhere been modified or found to be incoherent or not up to date. The vehicle then preferably adheres to the received control card.

According to one embodiment, it is provided that the method is implemented in response to the fact that an approach an intersection or junction is detected, wherein the approach is preferably detected using environmental sensors, in particular using a camera, using satellite navigation, using an electronic road map and/or using car-to-X communication.

This makes it possible to carry out the method in a situation that is particularly in need of regulation. This may also be the case in particular, if the approach involves several vehicles and/or this is identified. A junction can also be defined in particular as an access lane onto a motorway. An intersection can also be defined as a roundabout or any other branching or merging of roads.

It is preferable in this case that the traffic rules contained on the control card are assigned to the intersection or junction, in particular right-of-way and give way.

The control card can however also contain restrictions on overtaking or other traffic rules such as parking restrictions or speed limits. In this way, it is in particular also possible to centrally manage traffic rules and distribute them to vehicles.

According to one embodiment, it is provided that the central server is operated using a method according to the invention. Here, recourse can be made to all the named embodiments and variants. The advantages described apply accordingly.

According to one embodiment, it is provided that a respective control card or also a confirmation or other message via a radio connection, in particular in a car-to-X message, is transmitted between a vehicle and a central server, or between different vehicles.

These are understood to be, by way of example, technologies which allow direct communication between vehicles, without being reliant on the intermediary of a mobile network or other external infrastructure. This can also be understood as being technologies for communication between vehicles and infrastructure facilities, such as the central server.

According to one embodiment, is provided that together with a respective control card one or more of the following elements are sent or received:
  a registration number of a vehicle sending the control card,
  an identification number of a vehicle sending the control card,
  an intersection topology,
  object properties, in particular the manner, position and/or trajectory, of a vehicle sending the control card,
  information about the reliability of the control card and/or about the reliability of environmental sensors, in particular a camera,
  information about vehicles, which are not equipped with technology for participating in coordinating traffic regulations, in particular which are not equipped with car-to-X-communication technology, and in particular including their registration number,
  a measure of reliability.

Such information can improve and/or facilitate the evaluation of the control card in the receiving unit. A measure of reliability can relate for example to the quality of sensors of the transmitting vehicle and thus indicate how reliable the control card is, for example whether the road signs or intersection topologies have in fact been correctly identified.

According to one embodiment, it is provided that the control card, an additional control card, the first control card, the second control card and/or the control card to be sent is assigned to
  an intersection,
  a roundabout
  a junction, in particular joining a motorway,
  a narrow section,
  a stopping point
  and/or
  a road, in particular a road where overtaking is possible.

In such locations there are often situations where rules need to be applied, which can be controlled advantageously by means of the method according to the invention.

It should be understood that the invention also relates to a device for performing a method according to the invention. For example, such a device can be an electronic control device, which comprises processor means and storage means, a program code being stored in the storage means, whereby the method according to the invention is performed in this embodiment. A control device of this kind can also be integrated into another device for example, such as in a control device for automatic driving or driver assist systems. It can also be designed as a server, which stands at a central location, for example, or which is arranged as a roadside unit close to a road. Such a server is in particular designed to communicate with vehicles, for example via car-to-X communication or via a mobile radio network. The invention also relates to a non-volatile computer-readable storage medium, which contains program code, in which embodiment a method according to the invention is performed by a processor. Of course, in principle it is possible to access all of the described embodiments and variants of the method according to the invention.

Furthermore, an aspect of the invention relates to a system consisting of a number of vehicles, wherein each vehicle is designed to perform a method according to the invention, and wherein the vehicles are designed to communicate with one another, in particular for performing the method according to the invention and in particular by using car-to-X-communication. The system can also feature a central server designed to perform the method. The central server and the system vehicles can in particular be designed to communicate with each other, particularly through the use of car-to-X communication. With regard to the method according, to the invention it is possible to access all of the described embodiments and variants.

BRIEF DESCRIPTION OF THE DRAWINGS

A person skilled in the art can take further features and advantages of the invention from the example embodiments described in the following with reference to the accompanying drawing. In the latter.

DETAILED DESCRIPTION OF THE PREFERRED EMBODIMENTS

Figure 1:
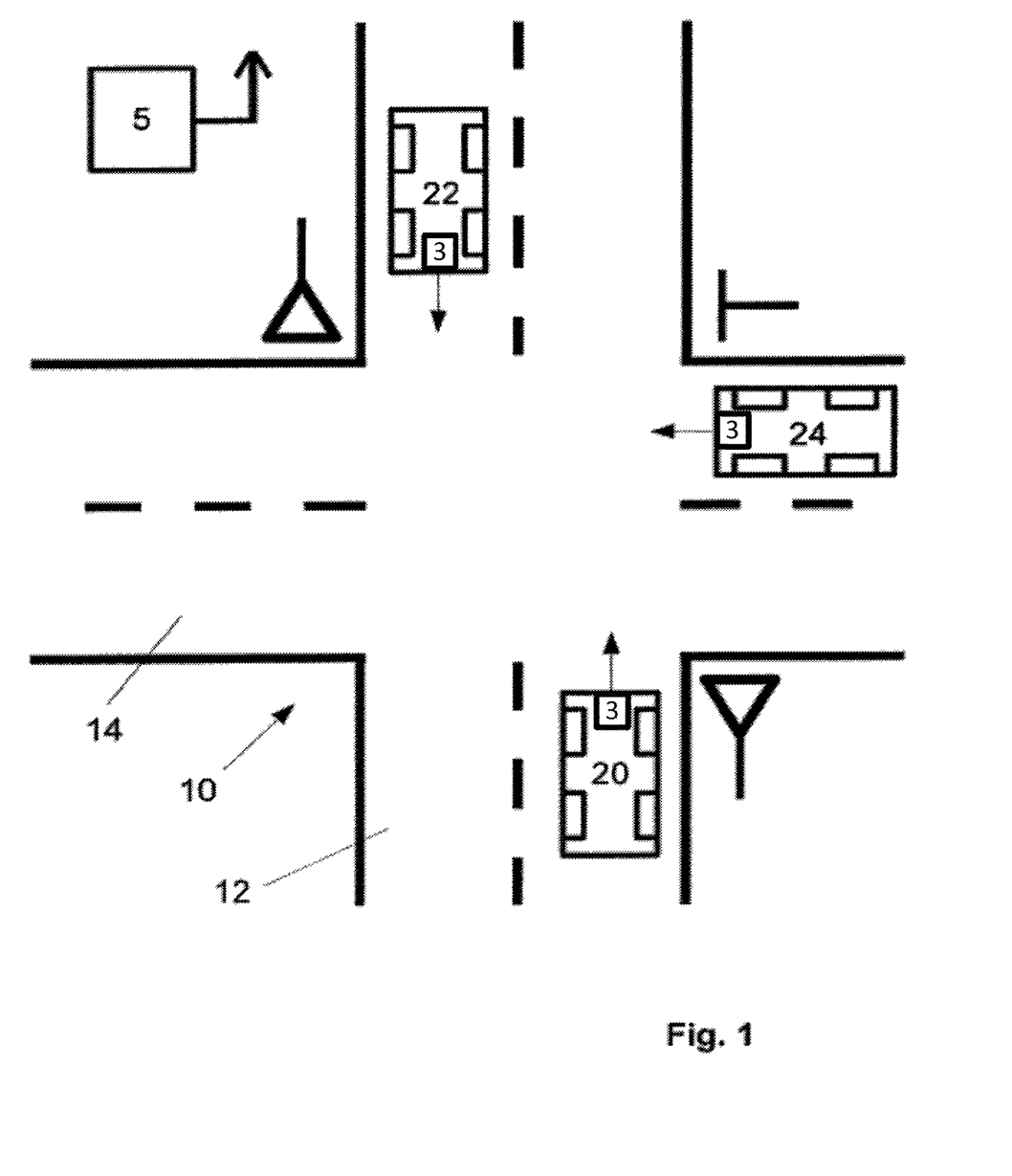
FIG. 1: shows a situation to be regulated at an intersection.

FIG. 1 shows an intersection 10 at which a first road 12 and a second road 14 cross at right angles. At a remote position, a central server 5 is provided which is designed to communicate with vehicles. This is shown only schematically here by an indicated antenna.

On the first road 12 a first vehicle 20 is driving towards the intersection 10. A second vehicle 22 is moving in the opposite direction on the other side of the intersection 10, wherein the latter is also driving towards the intersection 10. On the second road 14 a third vehicle 24 is driving transversely to the latter, which is also approaching the intersection 10. The vehicles 20, 22, 24 are only shown schematically. Respective arrows indicate the driving directions.

In the situation shown in FIG. 1, the unregulated continuation of all of the vehicles 20, 22, 24 would lead to a collision. For this reason there are right-of-way rules that determine the priority of the vehicles 20, 22, 24. The latter are indicated here by means of road signs, where the first vehicle 20 and the second vehicle 22 each have a sign in front of them which indicates to give way, whereas the third vehicle 24 has a right-of-way sign in front of it. From this rule it follows that the first vehicle 20 and the second vehicle 22 have to wait for the third vehicle 24 to pass first. Then the first vehicle 20 and the second vehicle 22 can drive on straight away as their paths do not cross.

It is assumed in this case that the first vehicle 20 identifies the traffic situation to be regulated first, as it determines by means of satellite navigation and electronic road card that it is driving towards an intersection and also identifies by means of environmental sensors 3 such as a camera that other vehicles are also approaching the intersection. By means of the camera the first vehicle 20 also identifies the give way sign, which tells the first vehicle 20 that it does not have right-of-way.

From this the first vehicle then derives a control card 11 (see FIG. 3) which is associated with the intersection 10. The control card 11 includes the traffic rule "give way" for the first vehicle 20. As in such a case in the absence of any indication of a differing right-of-way rule the opposite driving direction is also subject to the same traffic rule, the give way traffic rule is also included for the second vehicle. It is also known that at such intersections crossing traffic has right-of-way, when a specific vehicle has to give way. Therefore, the traffic rule "right-of-way" is also entered for the third vehicle 24 and for the opposite direction.

Figure 3:
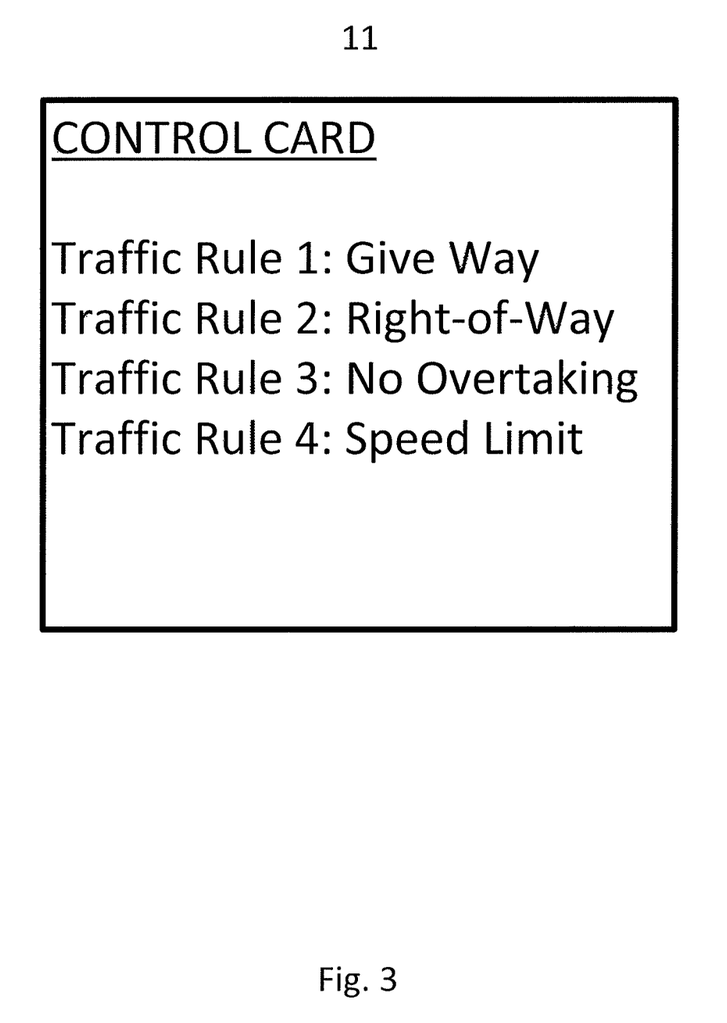
FIG. 3: shows an example of a control card.

The generated control card 11, which contains the previously mentioned traffic regulations in a specific generally known format, is then transmitted from the first vehicle 20 by environmental sensors 3, such as car-to-X-communication means, and received by the central server, 5.

Figure 4:
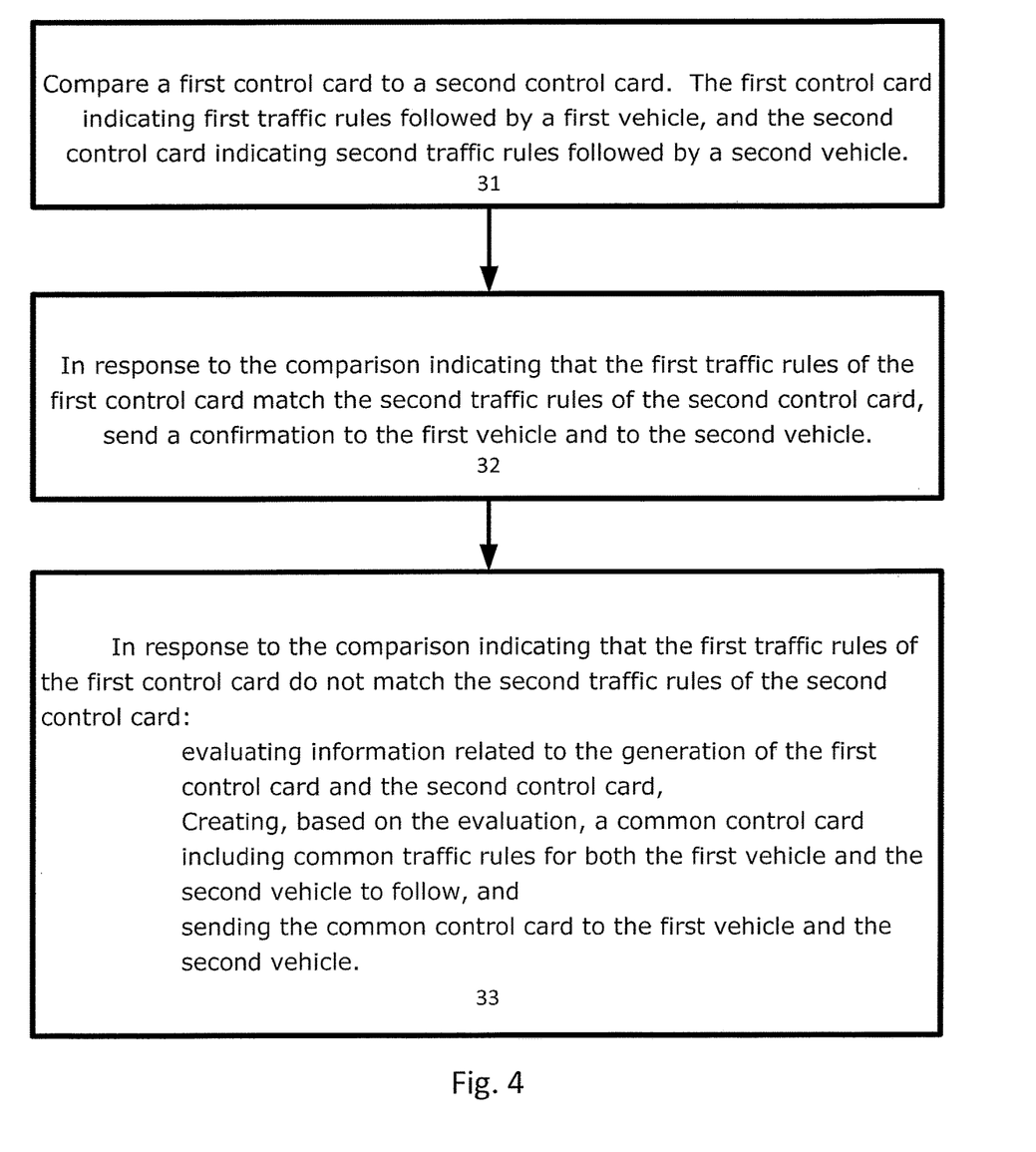
FIG. 4: shows an example of a method of operation based on the control card.

The other vehicles 22, 24 also create their own control cards by means of respective cameras in the same way as previously described. These control cards are also generated in the central server 5. There, they are compared (see step 31 in FIG. 4) with the control card generated by the first vehicle 20. If the control cards match (see step 32 in FIG. 4), the central server 5 sends a confirmation to the vehicles 20, 22, 24 that the control cards match and thus for all vehicles 20, 22, 24 it is possible to pass the intersection 10 without any risk by using identical control cards. The traffic rules contained in the common control card are displayed for the attention of the respective drivers of the vehicles 20, 22, 24.

If the rule maps do not match (see step 33 in FIG. 4), for example because one of the vehicles 20, 22, 24 has not correctly identified a traffic sign because it is covered with snow, a matching step is triggered which is performed by the central server 5.

Here, the control cards are assessed by the central server 5. In particular, information is evaluated which relates to the reliability of the respective camera, by means of which the control card has been created. Furthermore, a traffic regulation is considered more reliable if a greater numbers of vehicles have identified the latter independently of one another. Here, the procedure is performed iteratively.

If the central server 5 arrives at a shared control card within a specified maximum number of iteration steps, this control card is sent to the vehicles 20, 24, 26 and is observed by them. In this way it is possible to pass the intersection 10 without risk, wherein the traffic regulations contained in the common control card are displayed to the respective drivers. Should the server not arrive at a merged control card within a specified maximum number of iteration steps, the matching step is terminated and this is communicated to the vehicles 20, 22, 24. In this case a signal is given to the respective drivers of the vehicles 20, 22, 24, which asks them to make their own assessment of the traffic situation.

Figure 2:
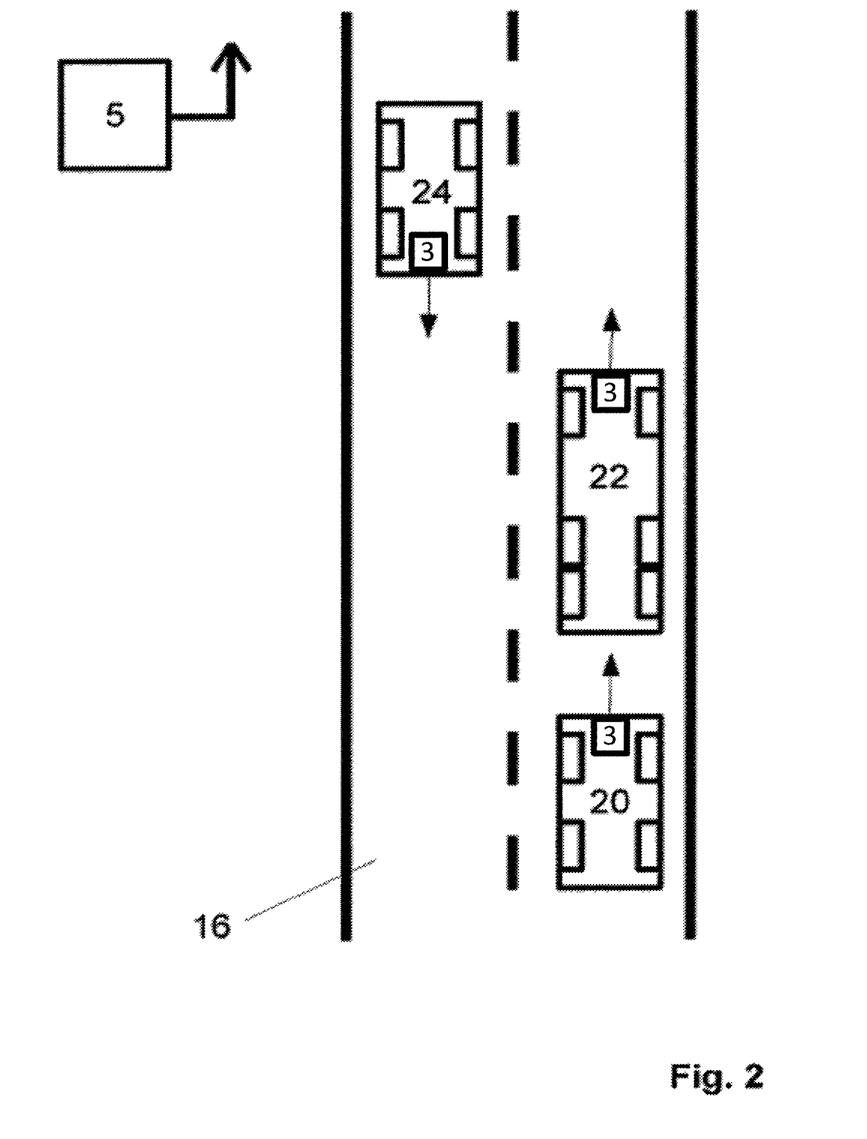
FIG. 2: shows a situation to be regulated on a road.

FIG. 2 shows a single-lane road 16, on which vehicles are driving in both directions. This consists of a first vehicle 20 which is following a second vehicle 22, and a third vehicle 24 traveling in the opposite direction. The second vehicle 22 is here a slow-moving lorry. Therefore, the first vehicle 20 has a reason for overtaking the second vehicle 22. Also, as in FIG. 1, a remote central server 5 is provided.

The second vehicle 22, being a commercial vehicle, is equipped with better sensors, in particular a better camera than the other vehicles 20, 24. Furthermore, it has a better field of vision over the road 16 than the following first vehicle 20. Therefore, the second vehicle 22 sends information to the first vehicle 20, in which it, shows that can be of assistance in performing an overtaking procedure. This information is first transmitted to the central server 5, which forwards it to the first vehicle 20.

If the driver of the first vehicle 20 would like to perform an overtaking procedure, he activates a button provided in the first vehicle 20. The intention to overtake is then sent in a message to the central server 5, and from there is forwarded to the second vehicle 22. The latter then detects with its camera the environmental situation in front of him and identifies the oncoming third vehicle 24, which will clearly stand in the way of the overtaking procedure of the first vehicle 20. The second vehicle 22 then creates a control card, which contains a temporary no overtaking rule for the road 16. This control card is sent by the second vehicle 22 to the server 5, which then forwards it to the first vehicle 20. This contains the control card and on the basis of the temporary overtaking restriction determines that an overtaking maneuver is currently not possible. This is displayed to the driver of the first vehicle 20, so the latter is requested not to perform the planned overtaking procedure. A collision with the third, vehicle 24 is effectively avoided in this way.

The control card sent by the second vehicle 22 to the server 5 first remains stored in said server, and is also available to other vehicles. This can be relevant, for example, when the first vehicle 20 turns off the road 16 without overtaking, and a further vehicle approaches the slowly-moving second vehicle 20 from behind. If the second vehicle 22 detects that there is no longer an obstacle to overtaking, it can inform the central server 5, which then deletes the control card or updates it accordingly.

Of course, the example embodiments shown here are only given in schematic form. For simplification, reference numerals are not inserted in the following claims. It is assumed that it would be straightforward to attribute the terms of the claims to the example embodiments.

In general, it should be noted that car-to-X-communication is defined in particular as direct communication between vehicles and/or between vehicles and infrastructure devices. For example it can consist of car-to-car communication or car-to-infrastructure communication. Where reference is made in this application to communication between vehicles this can be performed in principle for example as part of a car-to-car-communication, which is typically performed without communication through a mobile network or similar external infrastructure and which therefore should be differentiated from other solutions, which are based on a mobile network for example. For example, car-to-X-communication can be performed by using the standard IEEE 802.11p or IEEE1609.4. A car-to-X-communication can also be referred to as C2X-communication. The sub-areas can be denoted as C2C (car-to-car) or C2I (car-to-infrastructure).

Of course, a method according to the invention can also be performed for example by vehicles or with the involvement of vehicles, which do not have environmental sensors 3 such as for example cameras, RADAR or LIDAR. For example, such vehicles can approach an intersection or another location to which rules need to be applied, which is also being approached by other vehicles, which have environmental sensors 3. Vehicles without environmental sensors 3 typically cannot produce a control card, but can still participate in a matching procedure or matching step and contribute to providing a generally accepted and/or used control card.

It should be noted that a method according to the invention can be used in principle for all kinds of vehicles. In particular, it can be used for freely steerable or also automatically driving vehicles such as for example cars, lorries, buses or emergency vehicles. However, it can also be used for railed vehicles, for example for example trams or even normal trains. It can also be used in vehicles, which are operated by human or animal muscle power or in special vehicles such as for example in vehicles used for transport within plants, for example forklift trucks.

The claims belonging to the application are not a hindrance to the attainment of further protection.

Should it become clear that during the method one feature or a group of features is not absolutely necessary, the applicant has already attempted to formulate at least one independent claim, which no longer comprises the feature or the group of features. This can consist for example of a subcombination of a claim made on the day of application or a subcombination of a claim made on the day of application which is restricted by additional features. Such claims or combinations of features to be newly formulated are considered to be covered by the disclosure of this application.

It should also be noted that embodiments, features and variants of the invention, which are described in the various different embodiments or example embodiments and/or are shown in the Figures, can be combined with one another as desired. Individual or a plurality of features can be exchanged as desired. Combinations of features from the latter are considered to be covered by the disclosure of this application.

Back referrals in dependent claims to previous claims should not be considered to mean that independent, protection of the features of the dependent claims is being forfeited. Said features can also be combined as desired with other features.

Features which are only disclosed in the description or features which are disclosed in the description or in a claim only in connection with other features, can be considered to be significant independently as essential to the invention. They can therefore also be included in the claims individually for delimiting from the prior art.

The invention claimed is:

1. A method for operating a central server for processing control cards containing traffic rules, the method comprising:

comparing, by a processor of the central server, a first control card to a second control card, the first control card including data indicating first traffic rules followed by a first vehicle, the second control card including data indicating second traffic rules followed by a second vehicle, in response to the comparison indicating that the first traffic rules of the first control card match the second traffic rules of the second control card:
      sending, by a transmitter of the central server, a confirmation to the first vehicle and to the second vehicle, the confirmation instructing the first vehicle to be controlled by the first control card, and the second vehicle to be controlled by the second control card, and in response to the comparison indicating that the first traffic rules of the first control card do not match the second traffic rules of the second control card:
      evaluating, by the processor of the central server, information related to a first vehicle sensor of the first vehicle used to generate the first control card and a second vehicle sensor of the second vehicle used to generate the second control card,
      when the evaluation is successful in determining a common control card in a number of iterations:
         sending, by the transmitter, the common control card to the first vehicle and the second vehicle, the common control card including common traffic rules for both the first vehicle and the second vehicle, and the common control card instructing the first vehicle and the second vehicle to be controlled by the common control card, and
      when the evaluation is not successful in determining the common control card in the number of iterations, sending, by the transmitter, a request to a first driver of the first vehicle and to a second driver of the second vehicle to make their own assessment for controlling the first vehicle and the second vehicle.

2. The method according to claim 1,
   wherein the sending is performed by the first vehicle or the second vehicle in response to a reception of a command to the first control card and the second control card, and
   wherein the command contains information on the first control card and the second control card to be sent.

3. The method according to claim 2,
   wherein the sending is performed by the first vehicle or the second vehicle in response to a reception of the first control card or the second control card.

4. The method according to claim 1,
wherein the sending is performed by the first vehicle or the second vehicle in response to a reception the first control card and the second control card.

5. The method according to claim 1,
wherein the first control card has been received by the first vehicle, and
wherein the second control card has been received by the second vehicle or has been read from a database.

6. The method according to claim 1,
wherein the matching is performed for coordination between a number of vehicles involved including the first vehicle and the second vehicle, and
wherein the common control card to be sent is sent to all of the vehicles involved.

7. The method according to claim 1,
wherein the first vehicle and the second vehicle are involved in the matching which are approaching an intersection or junction or which are driving on the same road;
or
wherein the first vehicle and the second vehicle are exclusively involved in the matching from which an intersection of trajectories has been calculated.

8. The method according to claim 1,
wherein the matching is conducted by matching the first control card and the second control card or plausibility information of the first vehicle and the second vehicle, the plausibility information indicating a reliability of the first vehicle sensor of the first vehicle and the second vehicle sensor of the second vehicle used in generating the first control card and the second control card.

9. The method according to claim 8,
wherein a comparison of the first control card and the second control card or the plausibility information contains a respective plausibility check,
wherein a plausibility check comprises one or more of the following:
evaluating or weighting available information, with reference to information from the first vehicle and the second vehicle,
determining the significance or reliability of information,
checking which vehicles other than the first vehicle and the second vehicle have identical information or have sent identical information,
adding information complementary between the first control card and the second control card.

10. The method according to claim 1,
wherein when performing the matching one or more of the following are performed iteratively:
evaluating the significance or confidence level of information with thresholds or probabilities, including dangerous situations or driving mode such as self-driving or automatic driving of the first vehicle and the second vehicle,
plausibility checking,
bringing together all available information,
creating a new spatially extended and/or refined image, which has a consistent content.

11. The method according to claim 1,
which performing the matching further comprises identifying a blockage.

12. The method according to claim 11,
wherein, in the case of a blockage a third control card is created,
in which the first vehicle or the second vehicle without car-to-X-communication technology, are let through with priority, or
in which, in the case of an impasse, priorities are allocated to the first vehicle and the second vehicle on the basis of one or more of the following parameters:
driving speed,
fixed set of rules,
driving direction,
counter status of respective priority counter,
navigation information,
information about activated components,
information about indicators,
information about automatic steering,
information about giving way,
destination,
planned trajectory,
special action rights or provision of special right-of-way features,
or
wherein in the case of a blockage the matching procedure is interrupted.

13. The method according to claim 1,
wherein when performing the matching there is a random allocation of priorities to the first vehicle and the second vehicle,
wherein the first vehicle or the second vehicle with a higher priority has right-of-way.

14. The method according to claim 1,
which features, if a termination criterion is met during the matching, terminating the matching step.

15. The method according to claim 1,
wherein the first control card and the second control card are sent by the first vehicle and the second vehicle or received by the first vehicle and the second vehicle via a radio connection, in a car-to-X-message.

16. The method according to claim 1,
which further comprises:
storing of the common control card produced in the matching step, received by the first vehicle and the second vehicle or entered by a user in a database.

17. The method according to claim 16,
wherein the common control card is evaluated in the database before it is checked for plausibility on the basis of reliability of the first vehicle sensor of the first vehicle and the second vehicle sensor of the second vehicle used in generating the first control card and the second control card,
and the common control card is only stored in the database when the evaluation shows that the common control card should be stored.

18. The method according to claim 1,
wherein the first control card and the second control card via a radio connection, in a car-to-X message, are transmitted between the first vehicle, the second vehicle, and the central server.

19. The method according to claim 1,
wherein together with the first control card or the second control card one or more of the following elements are sent or received:
a registration number of the first vehicle sending the first control card or the second vehicle sending the second control card, an identification number of the first vehicle or the second vehicle, an intersection topology, object properties, of the first vehicle or the second vehicle, information about the reliability of the first control card or the second control card for about the reliability of environmental sensors, information about the first vehicle or the second vehicle, if the first vehicle or the second vehicle is not equipped with car-to-X-communication technology, and including the registration number of the first vehicle or the second vehicle, and a measure of reliability.

20. The method according to claim 1, wherein the first control card or the second control card to be sent is assigned to an intersection, a roundabout a junction, in particular joining a motorway, a section of the motorway having a width less than a threshold, a stopping point or a road, in particular a road where overtaking is possible.

21. A method for processing a control card control card containing traffic regulations in a vehicle, comprising:

identifying environmental surroundings by a number of environmental sensors of the vehicle, deriving, by a processor of the vehicle, a number of traffic regulations based on the environmental surroundings, producing, by the processor, the control card on the basis at least of the traffic regulations, the control card including data indicating the traffic regulations followed by the vehicle, sending, by a transmitter of the vehicle, the control card to a central server, in response the central server successfully evaluating information related to a vehicle sensor of the vehicle used to generate the control card and another vehicle sensor of another vehicle used to generate another control card, to determine a common control card in a number of iterations:

receiving, by a receiver of the vehicle, the common control card from the central server, the common control card including common traffic rules for both the vehicle and the another vehicle, and controlling, by the processor, the vehicle based on the common control card, and in response to the central server not successfully evaluating the information to determine the common control card in the number of iterations:

receiving, by the receiver, a request to a driver of the vehicle to make their own assessment for controlling the vehicle.

22. The method according to claim 21, further comprising after the sending, receiving the common control card from the central server.

23. The method according to claim 21, wherein the method is configured such that is possible to recognise an approach to an intersection or junction, wherein the approach is identified by environmental sensors including at least one of a camera, satellite navigation, an electronic road map or car-to-X-communication.

24. The method according to claim 23, wherein traffic rules contained in the common control card are assigned to the intersection or junction.

* * * * *